US012736981B2

(12) United States Patent
Su et al.

(10) Patent No.: US 12,736,981 B2
(45) Date of Patent: Sep. 15, 2026

(54) METHOD AND APPARATUS TO PERFORM DOWNHOLE COMPUTING FOR AUTONOMOUS DOWNHOLE MEASUREMENT AND NAVIGATION

(71) Applicant: SCHLUMBERGER TECHNOLOGY CORPORATION, Sugar Land, TX (US)

(72) Inventors: Tianxiang Su, Cambridge, MA (US); Suraj Kiran Raman, Cambridge, MA (US); Muhannad Abdelaziz Abuhaikal, Cambridge, MA (US); Andriy Gelman, Cambridge, MA (US); Farshid Mostowfi, Cambridge, MA (US)

( * ) Notice: Subject to any disclaimer, the term of this patent is extended or adjusted under 35 U.S.C. 154(b) by 0 days.

(21) Appl. No.: 19/101,024

(22) PCT Filed: Jul. 31, 2023

(86) PCT No.: PCT/US2023/029091
§ 371 (c)(1),
(2) Date: Feb. 4, 2025

(87) PCT Pub. No.: WO2024/030364
PCT Pub. Date: Feb. 8, 2024

(65) Prior Publication Data

US 2026/0036994 A1 Feb. 5, 2026

Related U.S. Application Data

(60) Provisional application No. 63/370,579, filed on Aug. 5, 2022.

(51) Int. Cl.
*G05D 1/644* (2024.01)
*G05D 1/247* (2024.01)
(Continued)

(52) U.S. Cl.
CPC ............ *G05D 1/644* (2024.01); *G05D 1/247* (2024.01); *G05D 2101/15* (2024.01); *G05D 2105/05* (2024.01); *G05D 2107/73* (2024.01)

(58) Field of Classification Search
CPC .... G05D 1/247; G05D 1/644; G05D 2101/15; G05D 2105/05; G05D 2107/73;
(Continued)

(56) References Cited

U.S. PATENT DOCUMENTS 5,732,776 A 3/1998 Tubel
5,947,213 A 9/1999 Angle
(Continued)

FOREIGN PATENT DOCUMENTS

AU 777154 A1 2/2002
CA 2478613 A1 8/2004
(Continued)

OTHER PUBLICATIONS

"Basic Steps To Shoot A Liquid Level using Echometers TWM", YouTube Vido accessed at [https://www.youtube.com/watchv=pZxZcDpQwIU], Echometer Company, Training Video, Jul. 2020, 5 pages.
(Continued)

*Primary Examiner* — Andrew Joseph Rudy
(74) *Attorney, Agent, or Firm* — Jeffrey D. Frantz

(57) ABSTRACT

Embodiments presented provide for an apparatus used for wellbore intervention, evaluation and stimulation. The apparatus provides a tractor mechanism, a power supply, tools and sensors used in evaluation and stimulation activities with hydrocarbon recovery operations.

18 Claims, 2 Drawing Sheets

(51) Int. Cl.

*G05D 101/15* (2024.01)
*G05D 105/05* (2024.01)
*G05D 107/70* (2024.01)

(58) Field of Classification Search

CPC ........... E21B 23/00; E21B 17/02; G01V 1/22; G01V 11/00; G01V 3/18
USPC ........................................................... 701/25
See application file for complete search history.

(56) References Cited

U.S. PATENT DOCUMENTS 6,378,627 B1 4/2002 Tubel et al.
6,454,011 B1 9/2002 Schempf
6,808,021 B2 10/2004 Zimmerman
6,845,819 B2 * 1/2005 Barrett .................. E21B 17/028 166/250.01
6,848,503 B2 2/2005 Schultz
7,143,843 B2 12/2006 Doering
7,303,010 B2 12/2007 De Guzman
7,458,421 B2 12/2008 Barrow
8,033,328 B2 10/2011 Hall
8,171,989 B2 5/2012 Goode
8,322,447 B2 12/2012 Loretz
8,786,113 B2 7/2014 Tinnen
8,899,322 B2 12/2014 Cresswell
8,981,957 B2 3/2015 Gano
9,109,419 B2 8/2015 Fenton
9,115,793 B2 8/2015 Nelson
9,145,761 B2 9/2015 Hallundbæk
9,523,789 B2 * 12/2016 Kamal .................. G01V 11/00
9,617,829 B2 4/2017 Dale
9,638,010 B2 5/2017 Kim
9,685,891 B2 6/2017 Feliu
9,920,613 B2 3/2018 Lee
10,030,505 B1 7/2018 Toniolo
10,072,480 B2 9/2018 Carroll
10,927,625 B2 2/2021 Fleckenstein
12,091,960 B2 * 9/2024 Kalyanraman ....... E21B 47/005
2002/0096322 A1 7/2002 Barrett et al.
2009/0014064 A1 1/2009 Shinohara
2009/0140604 A1 6/2009 Chen
2011/0094749 A1 4/2011 Richards
2011/0240303 A1 10/2011 Hallundbæk
2013/0241741 A1 9/2013 Hallundbaek
2015/0293258 A1 10/2015 Kamal et al.
2016/0032711 A1 2/2016 Sheiretov
2017/0299758 A1 10/2017 Pelletier et al.
2018/0209236 A1 7/2018 Talgø
2019/0031307 A1 1/2019 Siersdorfer
2019/0368331 A1 12/2019 Vick, Jr
2020/0165890 A1 5/2020 Homero Thome Ferreira
2021/0189820 A1 6/2021 Baklanov
2022/0205328 A1 6/2022 Fanini et al.
2024/0061124 A1 * 2/2024 Blois ...................... G01S 7/487
2024/0279993 A1 8/2024 Fripp
2024/0344431 A1 10/2024 Gupta
2025/0334009 A1 10/2025 Mueller

FOREIGN PATENT DOCUMENTS

CA 2704303 A1 5/2009
CA 2571787 C 5/2010
EP 2407631 A1 1/2012
EP 2176505 B1 3/2012
WO 2009016353 A2 2/2009
WO 2013112273 A2 8/2013
WO 2021046366 A1 3/2021
WO 2021225967 A1 11/2021
WO 2023187458 A1 10/2023

OTHER PUBLICATIONS

Ruland, E. A. I. et al., "Low cost underwater acoustic localization", Proceedings of Meetings on Acoustics, 2017, 13 pages.

Fox and Long, "PDDL2.1: An Extension to PDDL for Expressing Temporal Planning Domains", Journal of Artificial Intelligence Research, 20 (2003) pp. 61-124.

Fromont and Sriram, "Constraint Satisfaction as a Planning Process", In: Aritifical Intelligence in Design 92, 1992, pp. 97-117.

Leonetti et al., "A synthesis of automated planning and reinforcement learning for efficient, robust decision-making", Aritificial Intelligence, vol. 241, Dec. 2016, pp. 103-130.

Office Action issued in U.S. Appl. No. 18/649,469 dated Mar. 25, 2025, 15 pages.

International Search Report and Written Opinion of International Patent Application No. PCT/US2023/029091 dated on Nov. 20, 2023, 11 pages.

* cited by examiner

METHOD AND APPARATUS TO PERFORM DOWNHOLE COMPUTING FOR AUTONOMOUS DOWNHOLE MEASUREMENT AND NAVIGATION

CROSS-REFERENCE TO RELATED APPLICATIONS

This application is a National Stage Entry of International Patent Application No. PCT/US2023/029091, filed on Jul. 31, 2023, which claims priority to U.S. Provisional Patent Application No. 63/370,579, titled "Method and Apparatus to Perform Downhole Computing for Autonomous Downhole Measurement and Navigation," filed on Aug. 5, 2022, the contents of which are incorporated by reference.

FIELD OF THE DISCLOSURE

Aspects of the disclosure relate to hydrocarbon recovery operations. More specifically, aspects of the disclosure relate to a computer engine that interacts with a driving mechanism, power supply tools and sensors used in hydrocarbon recovery operations for use in an autonomous robot for evaluation and stimulation activities.

BACKGROUND

Hydrocarbon recovery operations occur worldwide and are important to every day society. As time has progressed, the world's easily recoverable hydrocarbons are consumed leaving more deposits that are more difficult to access.

While the more difficult fields of hydrocarbons still exists, these fields are generally remote from industrial centers. Properly assessing these fields, as well as properly stimulating economical fields found becomes a priority for oil field service companies.

Skilled operators are not always present in all locations, but the need for very accurate data and operations still exist. Since these needs are unfulfilled, oil field service companies are attempting to rapidly develop machines to perform the necessary field functions. These necessary field functions can include, but are not limited to detailed wellbore evaluation, sampling, logging and stimulation.

Generally, conventional systems provide a tethered robot that performs commands provided by a surface operator. These conventional systems, however, are of little use without the skilled operator inputting the necessary functions.

There is a need for providing an untethered robotic system that allows for different field functions to be performed.

There is a further need to provide a computer engine that will instruct systems of the untethered robot in operations that are need for, but not limited to, evaluation, logging and stimulation.

There is a still further need to provide a computer engine that is robust for anticipated harsh environments, such as high heat, pressure and vibration.

There is a still further need to provide a computer engine that will be adaptable to different robotic systems to allow an unskilled operator to "plug and play" the computer engine in different apparatus.

There is also a need to provide a computer engine that is economical in design and construction for the wellbore environment.

There is a further need to provide a computer engine that is economically superior to conventional control systems and provides sufficient fault tolerance for wellbore operations.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for performing downhole computations is disclosed. The method may comprise training an autonomous vehicle to perform operations in a downhole environment. The method may also comprise inserting the autonomous vehicle to the downhole environment. The method may also comprise obtaining at least one wellbore characteristic through a sensor in the autonomous vehicle. The method may also comprise processing at least one wellbore characteristic using a compute engine.

In another example embodiment, a downhole autonomous vehicle for intervention, evaluation, or stimulation. The downhole autonomous vehicle comprises a driving mechanism such as a tractor. The downhole autonomous vehicle may also comprise a power supply. The downhole autonomous vehicle bot may also comprise a plurality of sensors to acquire real-time data across different modalities. The downhole autonomous vehicle bot may also comprise a compute engine disposed within the downhole autonomous vehicle, wherein the compute engine handles processing and computations on-board. The downhole autonomous vehicle may also comprise interfaces, wherein the interfaces transfer data to and from the compute engine.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

Figure 1:
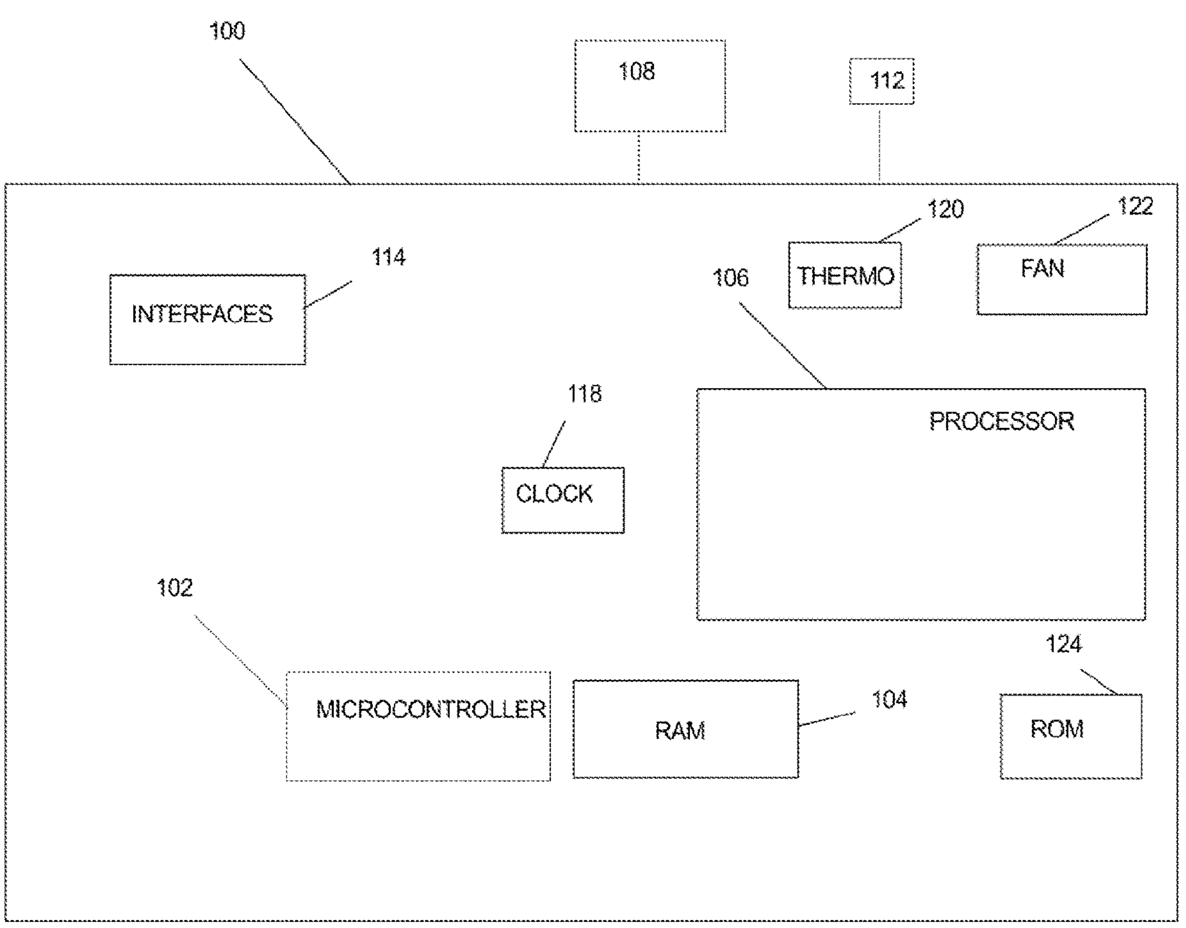
FIG. 1 is a system layout of components of an arrangement in one example embodiment of the disclosure.

To facilitate understanding, identical reference numerals have been used, where possible, to designate identical elements that are common to the figures ("FIGS."). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

In embodiments, aspects of the current disclosure relate to an untethered downhole robot for intervention, evaluation, or stimulation consists of a driving mechanism (e.g., tractor), a power supply (e.g, battery), tools and sensors, and an onboard downhole compute engine. Aspects herein provide the fundamental algorithms to operate of the downhole compute engine for such an untethered downhole robot. The apparatus described herein may be referred to as an autonomous robot or an autonomous vehicle.

In one embodiment, a building block of an autonomous robot involves the operational control unit that provides a compute engine. A powerful compute engine enables the seamless autonomy of a robot. A compute engine as herein defined, includes all the hardware integrated as part of the robot that handles processing and computations on-board. This could either be a single dev-board (like a Raspberry Pi) or combinations of different micro-processors, micro-controllers, and dev-boards with each handling specific workloads.

Compute Functionalities

Compute engines for these downhole robots have capabilities to enable the performance of tasks related to data acquisition, task planning, robot actuation and navigation. Thus, the requirements for a compute engine can be derived based on the above-mentioned necessary functionalities. Some of the tasks are described below as well as the configurations and tasks related to the functionalities.

Data Acquisition

Different sensors on-board the robot, in embodiments, acquire real-time data across different modalities. In one example embodiment, these logs are time/depth synced and logged onto the on-board memory storage for further processing. In some embodiments, the data may be transmitted to an up-hole environment. In embodiments, dedicated micro-controllers are used to write logs onto an on-board memory storage. Data can include logs from job-specific sensors, as well as those that assist the functioning of the robot (for navigation). In embodiments, the compute engine is provided with an interface. The interface may support various interfaces for querying sensor measurements. These interfaces are typically SPI, CAN-FD, I2C. The compute engine may also have a real-time ARM core (i.e., ARM Cortex M4) that may be used for real-time tasks.

Factors For Consideration—Memory Storage, Communication Interfaces

Data Compression

Data acquired from all the different sensors on-board can be compressed further through a lossless compression scheme thereby saving on-board storage space without compromising on information loss. In embodiments, the compute engine is capable of running lossless compression algorithms, such as LZ4 need support certain compression algorithm.

Factors for Consideration—Flash, RAM, CPU, Datasets, Sample Rate

Autonomous Navigation

For an autonomous downhole robot, in the aspects described, mechanisms are provided that enable the robot's localization (absolute and relative depths) along a journey through the well to ensure operational certainty (acquire high-quality measurements/setting a plug/operating valve, etc.). Some of the most common ways of estimating downhole depth include:

1. CCL Logs: Feature Matching and Correlation based on Casing Collar Locator logs
2. Gamma Ray Logs: Feature Matching and Correlation based on Gamma Ray logs
3. Odometry: Using accelerometers or logs from drivers/motors
4. Pressure and Density Measurements: Pressure measurement alone can provide an indication of motion in vertical or deviated sections of the well. The use of density measurement in addition to pressure measurement, can provide a reliable source of depth measurement.
5. Acoustic Localization: Generating pressure pulses and listening to the echoes bouncing back from the casing collars or the surface.

6. Mechanical CCL: Unlike legacy toolstrings, downhole robot makes direct contact with the casing to move along the well. This opens an opportunity to detect the change in casing ID mechanically. For example, we can detect the change in contact pressure, or we can detect the configuration change of the drive when passing the narrower casing sections. We call these types of methods the mechanical CCL methods.
7. Two measurements separated by a known distance. These measurements are placed in the body of the robot at two different points with known separation distance to allow multiple detection of the same feature for depth and speed estimations.

In embodiments, the compute engines are able to process the acquired logs and infer the absolute and/or relative depth using intelligent algorithms. These algorithms can either be data-driven Machine Learning based inference models (high compute resources) or statistical inference techniques (less compute resources) like Bayesian filtering. To ensure certainty with respect to depth estimation, a sensor fusion-based approach may also be used fusing multiple measurements.

In some embodiments, for downhole robots, acoustic localization may be used. For example, depth may be inferred by generating upward-travelling pressure pulses and the depth inferred by listening to the echoes bouncing back from the casing collars and the surface. Similarly, one can generate pressure pulses from the surface using a known time pattern (e.g., every 30 seconds). The robot can then time the intervals between the arriving pulses to determine the distance the robot travelled. The echoes generated by the collars can also be used to infer its relative depth. Note that the use of pressure-pulses for depth estimation requires an accurate clock on the robot that minimizes time drift issue under challenging temperature and pressure conditions.

Factors for Consideration—CPU, RAM

Job Planning

Given that the downhole robots are autonomous with limited to almost zero contact with the surface, embodiments provide an autonomous planner. Such a planner enables identifying and prioritizing the subsequent tasks for the downhole robot. In addition, these planners can be used in real-time to mitigate failures downhole. The compute engine must support the execution of such artificial intelligence ("AI") based planners.

Different methods/frameworks exist for plan generation and dispatching. Examples include (1) AI planning (2) Constraint Satisfaction Programming, and (3) Reinforcement learning.

AI planning is the most established method for job planning. This job planning may be applied in different domains (e.g., drilling, Wireline, coiled tubing conveyance). To use this method, the domain knowledge may be captured, in one non-limiting embodiment, using languages like PDDL2.1. Then a domain-independent framework is used generate the plan based on the current system state (current depth) and the goal state. Example AI planning frameworks my include, for example, systems utilizing Metis and/or the opensource POPF/Fast Downward planning framework. Finally, an executor takes the plan and executes it using methods like the Finite-state Machine (FSM) or Behavior Tree (BT) algorithms.

To use Constraint Satisfaction Programming (CSP), the planning problem may be used to create a set of states and mathematical constraints. The CSP will then find a solution that satisfies the constraints and create a plan.

Reinforcement learning (RL) is relatively less established compared to the previous two methods. To use this method, a simulator is developed that simulates the interactions between the robot and the environment (wellbore). Then, using a RL framework, an algorithm is used to train and to generate plans by trying many actions in the simulator under different conditions. The training occurs offline before the jobs. Then the trained algorithm can be used to create plans during execution.

For downhole robots, challenges for planning include (1) discrete system states (e.g., robot state: stopped, RIH, or POOH), but some are continuous (e.g., battery life, current depth). The planning framework may be configured to be able to handle this mixed-state system. (2) Some states cannot be observed directly and can only be inferred with uncertainty (e.g., depth). (3) The system is not deterministic. Actions can lead to different states with probabilities (e.g., a small chance of getting stuck). The planning framework needs to consider this to generate an optimal plan. (4) After the plan is dispatched, some key states of the system need to be continuously monitored (e.g., state of the battery).

Factors for Consideration—CPU, RAM

Autonomous Actuation

The compute engine is also used to drive the downhole robot through the well controlling the actuators and the drivers to actuate the robot in the right directions and speeds.

Factors for Consideration—Power Estimation for the Actuation

Battery/Power Management

Power management is configured to work in conjunction with planning to determine the power required to perform the tasks and if necessary, abandon the job and climb back to the surface.

In embodiments, states are possible to put the compute engine into low power mode to conserve battery. The CPU could be woken up by a timer or specific events.

One other important functionality of the compute engine is the continuous monitoring of the batteries. The health and capabilities of the battery determines the safe operation of the downhole robot. Continuous health monitoring when coupled with the planner helps in effectively planning the available tasks accordingly given the current battery life. This can include scenarios wherein plans may be regenerated like heading back to the docking station immediately, if it is not anticipated that enough power is provided to complete all the tasks, thereby avoiding downhole fishing scenarios.

Communication and Telemetry

Based on the design requirements, a telemetry module can be added to communicate with surface and that can be processed on the compute engine.

Differing Embodiments

A major challenge for the compute engines comes from the operating conditions. Given that the robot is intended to be operated downhole at extreme temperatures (>150 C), the available options are very limited. This is primarily because the regular out-of-the-box solutions like a BeagleBone/Raspberry Pi/Jetson TX2 boards contain components that are not qualified for downhole usage given the operating temperatures. For example, the operating temperatures for Raspberry PI, and for nVidia Jetson TX2 is −25 to 80 deg Celsius. As a result, digital components used in these boards will be qualified and approved before the actual usage.

Daytona

One suitable starting option for a compute engine given our requirements would be the Daytona Digital. The embodiment provides a Linux based environment downhole, thereby simplifying the process of developing and deploying software programs to how it's done on a desktop computer. In one non-limiting embodiment, the Daytona digital engine has the following configurations:

- Operating Temperature: <165 deg C
- Processor: AM3359, ARM Cortex A8 (AM6442, multi-core in dev)
- Processor speed: 600 MHz
- RAM: DDR2 64/128 MB
- On-board Memory Storage: 2 to 8 GB
- Operating System: Linux.
- Power Consumption: ~3 W (Ability to shift to low power mode, and wake up based on a timer).
- Dimensions: 50 mm×33 mm The Daytona digital engine is fully qualified (all the associated components are qualified) for usage downhole, including but not limited to temperature, vibration, shock and other characteristics. The most significant advantages specific to a downhole robot include its wide range of operating temperatures, low-power consumption, and the availability of Linux on board.

Jetson TX2

Nvidia's off-the-shelf edge computing board, the Jetson TX2 offers strong compute capabilities, specifically with GPU compute power at the edge. This could be very useful in data-driven AI/ML based solutions. In one non-limiting embodiment, the Jetson TX2 has the following configurations:

- Operating Temperature: <80 deg C
- GPU: NVIDIA Pascal™ architecture with 256 NVIDIA® CUDA® cores
- CPU: Dual-core NVIDIA Denver 2 64-bit CPU and quad-core Arm® Cortex®-A57 MPCore processor complex
- Memory: 4 GB 128-bit LPDDR451.2 GB/s
- Storage: 16 GB eMMC 5.1
- Power 7.5 W|15 W
- AI Performance: 1.33 TFLOPS
- Dimensions: 87 mm×50 mm.

BeagleBone

Another popular option for a compute engine is the BeagleBoard. The BeagleBoard has the following configurations,

- Operating Temperature: <85 deg C
- Processor: AM335x ARM Cortex A
- Processor speed: 1 GHz
- RAM: 512 MB DDR3
- On-board Memory Storage: 4 GB on-board flash, micro SD Card slot
- Operating System: Linux
- Power Consumption: 10 W
- Dimensions: 90 mm×130 mm All the above options, described above, may be used in different configurations. As different configurations may be used for different environments, the ideal configuration can be derived from different evaluations for different environments. For example, improvements in the RAM, On-board memory storage etc.

Referring to FIG. 1, an example embodiment of the disclosure is presented. An engine 100 is provided to perform the necessary computing tasks. Microcontrollers 102 are connected to an on-board memory 104. In embodiments, a central processing unit 106 is provided to perform calculations. A power source 108 is provided to provide electrical energy to the components of the engine 100. Random access memory 110 is provided to provide memory functions necessary for the engine 100. Sensors 112 are provided to allow for sensing of different conditions in the downhole environment. The sensors 112 may be configured to provide temperature measurement, distance measurement, vibration measurement as non-limiting embodiments. Interfaces 114 are provided to allow for data to be transferred to and from the engine 100. The interfaces 114 may be configured using the following non-limiting protocols: SPI, CAN-FD, I2C. An output 116 may be provided for the engine 100 to allow instructions and actuations of different components in the robot to be operated. Such instructions and actuations may be, for example, driving of a motor for the purpose of moving the motor. A clock 118 may be provided to allow for timing of functions provided by the engine 100. A thermometer 120 is provided to measure the temperature of the engine 100. Based upon the temperature measured by the thermometer 120. a fan 122 may be actuated cooling the engine 100. Boot responsibilities for the engine 100 are provided through programming and read only memory ("ROM") 124.

Figure 2:
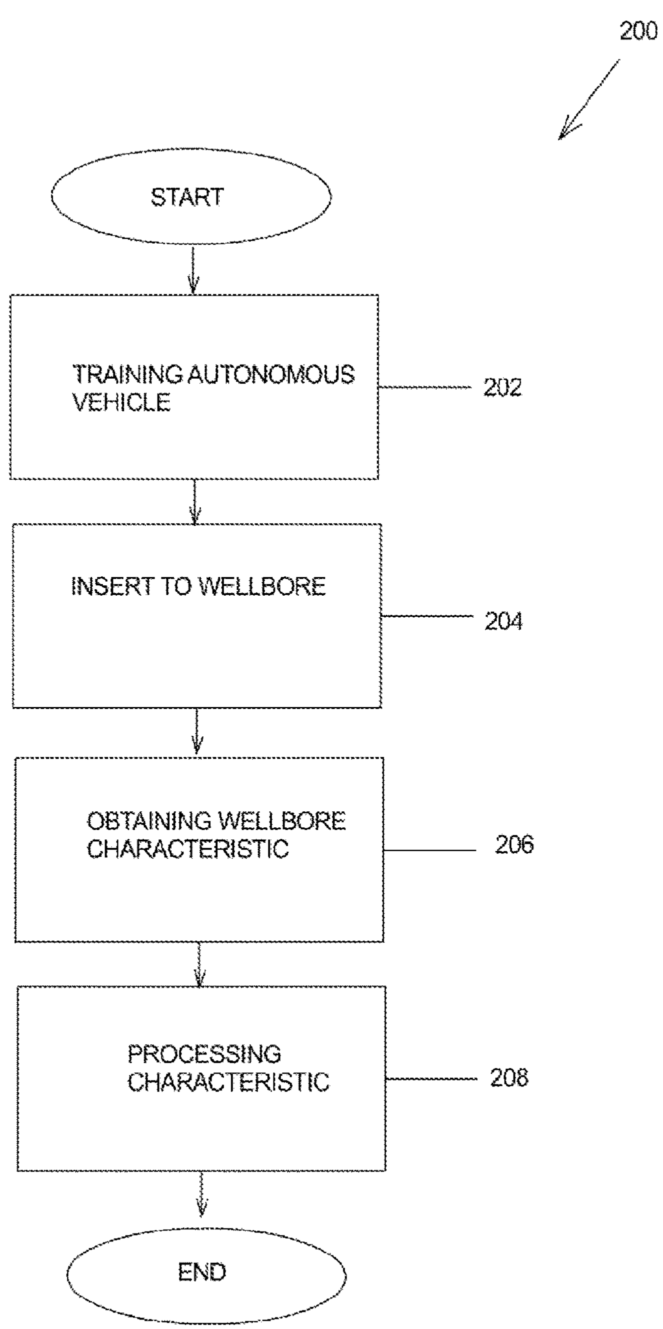
FIG. 2 is an illustration of a method of performance of a task of an autonomous robot in one example of the disclosure.

Referring to FIG. 2, a method for performing downhole computations is illustrated. The method 200 provides for training an autonomous vehicle to perform operations in a downhole environment at 202. At 204, the method includes inserting the autonomous vehicle into the wellbore. At 206, the method further includes obtaining at least one wellbore characteristic through a sensor in the autonomous vehicle. At 208, the method further comprises processing the at least one wellbore characteristic using the at least one wellbore characteristic and the training to perform a trained autonomous vehicle action, wherein the processing is performed through a compute engine.

In one example embodiment, a method for performing downhole computations is disclosed. The method may comprise training an autonomous vehicle to perform operations in a downhole environment. The method may also comprise inserting the autonomous vehicle to the downhole environment. The method may also comprise obtaining at least one wellbore characteristic through a sensor in the autonomous vehicle. The method may also comprise processing at least one wellbore characteristic using a compute engine.

The method may also be performed wherein at least one wellbore characteristic is a distance traveled, a wellbore pressure and a wellbore temperature.

The method may also be performed, wherein the autonomous vehicle comprises a tractor configured to move the autonomous vehicle.

The method may also be performed, wherein the compute engine is a Linux based system.

The method may also be performed, wherein the compute engine uses artificial intelligence to control the autonomous functions of the vehicle.

The method may also be performed, wherein vehicle has a telemetry module to determine positioning of the vehicle.

The method may also further comprise performing a calculation to plan an action by the autonomous vehicle, determining a required power for the autonomous vehicle to perform the action by the autonomous vehicle and checking a power remaining aboard the autonomous vehicle.

The method may also further comprise performing the action by the autonomous vehicle when the power remaining aboard the autonomous vehicle is greater than the required power for the autonomous vehicle to perform the action.

The method may also further comprise refusing to perform the action by the autonomous vehicle when the power remaining aboard the autonomous vehicle is lesser than the required power for the autonomous vehicle to perform the action.

The method may also further comprise saving at least one wellbore characteristic to a memory of the autonomous vehicle.

The method may also further comprise performing an autonomous planning action by the autonomous vehicle by the compute engine.

The method may be performed, wherein the compute engine uses an artificial intelligence planning methodology.

The method may be performed, wherein the compute engine uses constraint satisfaction programming.

The method may be performed wherein the compute engine uses reinforcement learning.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A downhole robot for intervention, evaluation, or stimulation, comprising:
- a driving mechanism;
- a power supply operatively connected to the driving mechanism;
- a plurality of sensors operatively connected to the power supply;
- a trained model for autonomous operation of the downhole robot, the trained model being generated by training the downhole robot to perform operations in a downhole environment, the training comprising generating the trained model using a simulated downhole environment, and the training being performed prior to deployment of the downhole robot;
- a compute engine disposed within the downhole robot and operatively connected to the power supply, the compute engine being configured to:
  - handle processing and computations on-board the downhole robot;
  - receive at least one wellbore characteristic from the plurality of sensors;
  - use the trained model for autonomous operation of the downhole robot;
  - plan one or more actions of the downhole robot based on the trained model; and
  - cause autonomous execution of the one or more planned actions by the downhole robot in the downhole environment; and
- at least one interface configured to transfer data to and from the compute engine.

2. The downhole robot of claim 1, wherein the compute engine is a Linux-based system.

3. The downhole robot of claim 1, wherein the driving mechanism is a tractor.

4. A method, comprising:
- training an autonomous vehicle to perform operations in a downhole environment, the autonomous vehicle comprising at least one sensor, the training being performed prior to deployment of the autonomous vehicle, the autonomous vehicle comprising a downhole robot, the training comprising:
  - generating a trained model for autonomous operation of the autonomous vehicle; and
  - using a simulated downhole environment to generate the trained model;
- inserting the autonomous vehicle into the downhole environment;
- obtaining at least one wellbore characteristic using data from the at least one sensor in the autonomous vehicle;
- processing the at least one wellbore characteristic using a compute engine using the trained model, the compute engine being disposed within the autonomous vehicle;
- planning, by the compute engine, one or more actions of the autonomous vehicle based on the trained model; and
- causing, by the compute engine, autonomous execution of the one or more planned actions by the autonomous vehicle in the downhole environment.

5. The method of claim 4, wherein the at least one wellbore characteristic is one or more of: a distance traveled, a wellbore pressure, or a wellbore temperature.

6. The method of claim 4, wherein the autonomous vehicle comprises a tractor configured to move the autonomous vehicle.

7. The method of claim 4, wherein the compute engine is a Linux-based system.

8. The method of claim 4, wherein the compute engine uses artificial intelligence to control autonomous functions of the autonomous vehicle.

9. The method of claim 4, wherein the autonomous vehicle comprises a telemetry module configured to determine positioning of the autonomous vehicle.

10. The method of claim 4, further comprising:
- performing a calculation to plan the one or more actions by the autonomous vehicle;
- determining a required power for the autonomous vehicle to perform the one or more actions by the autonomous vehicle; and
- checking a power remaining aboard the autonomous vehicle.

11. The method of claim 10, further comprising performing, by the autonomous vehicle, the one or more actions when the power remaining aboard the autonomous vehicle is greater than or equal to the required power for the autonomous vehicle to perform the action one or more actions.

12. The method of claim 10, further comprising refusing, by the autonomous vehicle, to perform the one or more actions when the power remaining aboard the autonomous vehicle is less than the required power for the autonomous vehicle to perform the one or more actions.

13. The method of claim 4, further comprising saving the at least one wellbore characteristic to a memory of the autonomous vehicle.

14. The method of claim 4, wherein the processing the at least one wellbore characteristic using the compute engine using the trained model comprises:
- processing acquired logs to infer at least one of an absolute or a relative depth using Bayesian filtering; and
- fusing multiple measurements using a sensor fusion-based approach.

15. The method of claim 4, wherein the compute engine uses an artificial intelligence planning methodology to plan the one or more actions of the autonomous vehicle.

16. The method of claim 4, wherein the compute engine uses constraint satisfaction programming to plan the one or more actions of the autonomous vehicle.

17. The method of claim 4, wherein the compute engine uses reinforcement learning to plan the one or more actions of the autonomous vehicle.

18. The method of claim 4, wherein the at least one wellbore characteristic processed using the compute engine comprises at least one of: Casing Collar Locator (CCL) Logs, Gamma Ray Logs, Odometry, Pressure and Density Measurements, Acoustic Localization, or Mechanical CCL.

* * * * *